United States Patent
Levy et al.

(10) Patent No.: US 10,787,090 B2
(45) Date of Patent: Sep. 29, 2020

(54) METHOD AND PROCESS OF ADMINISTRATING RECHARGING OF ELECTRIC VEHICLES USING LOW COST CHARGE STATIONS

(76) Inventors: Paul S. Levy, Chandler, AZ (US);
Edward Butler, Gilbert, AZ (US);
John C. Thomas, Beaverton, OR (US)

( * ) Notice: Subject to any disclaimer, the term of this patent is extended or adjusted under 35 U.S.C. 154(b) by 229 days.

(21) Appl. No.: 12/605,318

(22) Filed: Oct. 24, 2009

(65) Prior Publication Data
US 2011/0099144 A1    Apr. 28, 2011

(51) Int. Cl.
*G06Q 30/00* (2012.01)
*B60L 53/30* (2019.01)
*H02J 7/00* (2006.01)

(52) U.S. Cl.
CPC ............. *B60L 53/30* (2019.02); *H02J 7/0027* (2013.01); *Y02T 10/70* (2013.01); *Y02T 10/7072* (2013.01); *Y02T 90/12* (2013.01); *Y02T 90/14* (2013.01); *Y02T 90/167* (2013.01); *Y04S 30/12* (2013.01)

(58) Field of Classification Search
None
See application file for complete search history.

(56) References Cited

U.S. PATENT DOCUMENTS

| | | | | |
|---|---|---|---|---|
| 8,676,636 | B2 * | 3/2014 | Genschel | B60L 53/665 705/13 |
| 2003/0055710 | A1 * | 3/2003 | Burk | G06Q 10/06 705/64 |
| 2007/0174621 | A1 * | 7/2007 | Ducharme | G06F 21/10 713/176 |
| 2007/0198432 | A1 * | 8/2007 | Pitroda | G06F 21/606 705/64 |
| 2009/0224939 | A1 * | 9/2009 | Stocker | B60L 53/65 340/870.02 |
| 2010/0274656 | A1 * | 10/2010 | Genschel | G06Q 30/0226 705/14.27 |
| 2010/0280956 | A1 * | 11/2010 | Chutorash | G06Q 20/20 705/64 |
| 2014/0052640 | A1 * | 2/2014 | Pitroda | G06F 19/00 705/67 |

FOREIGN PATENT DOCUMENTS

| | | | | |
|---|---|---|---|---|
| DE | 10304284 A1 * | 8/2004 | | B60L 53/14 |
| EP | 2141043 A1 * | 1/2010 | | B60L 3/0046 |
| JP | 2009100606 A * | 5/2009 | | Y02T 90/168 |

OTHER PUBLICATIONS

• Neetesh Saxena et al. State of the Art Authentication, Access Control, and Secure Integration in Smart Grid. (Aug. 14, 2003). Retrieved online Aug. 14, 2020. https://www.mdpi.com/1996-1073/8/10/11883/htm (Year: 2003).*
• Lun Ka Lam et al. Metering Infrastructure for Electric Vehicle Charging. (Nov. 20, 2001). Retrieved online Aug. 14, 2020. https://file.scirp.org/Html/2-6401105_8270.htm (Year: 2001).*
• Chapter 12—Monitoring and Metering. (Mar. 31, 1998). Retrieved online Aug. 14, 2020. https://www.cl.cam.ac.uk/~rja14/Papers/SEv2-c12.pdf (Year: 1998).*

* cited by examiner

*Primary Examiner* — James A Reagan

(57) ABSTRACT

A method and system is provided in which an electric automotive charging station connects to the host computer system using un-dedicated network resource contained within the electric vehicle to be charged enabling un-supervised (non-networked) deployment of said charging stations.

1 Claim, 12 Drawing Sheets

METHOD AND PROCESS OF ADMINISTRATING RECHARGING OF ELECTRIC VEHICLES USING LOW COST CHARGE STATIONS

CROSS REFERENCE TO RELATED APPLICATIONS

This application claims the benefited of our earlier filled provisional application titled: Method and process of administrating recharging of electric vehicles using low cost charge stations filed on Oct. 9, 2009 and filled provisional application titled: Method and Process of billing for goods leveraging a single connection action filed on Oct. 9, 2009.

FIELD OF THE INVENTION

The present invention relates to the field of data communication, authentication and billing as it relates to the cost of power used to re-charge Electrical Vehicles. More specifically, the present invention relates to a method, apparatus, and system providing for the means to bind billing information from the consumer to the vendor of Electric Vehicle charging services without a pre-established permanent communications method from the Charge Station or dependence on financial institutions credit card or debit card services.

BACKGROUND

As electrical vehicles enter mass production there is a desire to conveniently extend operating range. Today, this range is extended by employment of a hybrid self-contained, gas fueled, motor-generating set. As battery technology increases storage capacity, the need for self-contained power generation decreases. This increases the operating range of the electric only operating mode. This extended range will have the effect of changing the operating mindset to that similar to gas fueled in that the deployment of ubiquitous electrical charging stations extends the vehicle operation thus becoming un-tethered from its home base. The key to extended range operation is the convenient use of Charging Stations that are both simple to manufacture and low cost to maintain and deploy.

SUMMARY OF THE INVENTION

In accordance with one aspect of the invention, there is provided a circuit arrangement which includes a central processor. The central processor includes flash memory that contains a unique private key in accordance with a-symmetrical encryption methods used to decrypt and verify trusted messages, a Wire-Line radio used to send and receive messages to and thru a connected electric vehicle, a display panel used to indicate status.

In accordance with another aspect of the invention, there is provided a circuit arrangement which includes a switch that connects utility power to the connected electric vehicle.

In accordance with an additional aspect of the invention, there is provided a circuit arrangement which includes a current measurement device which reports the amount of power delivered to the connected electrical vehicle.

In accordance with a further aspect of the invention, a method is provided for controlling with a central processor, the operation of the Wire-Line radio, the operation of the switch, the messages to and from the Electric Vehicle, the messages thru the Electric Vehicle to an authentication method by means of a wireless radio.

The above summary of the present invention is not intended to describe each illustrated embodiment, or every implementation, of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings in which.

DETAILED DESCRIPTION OF THE INVENTION

In the following detailed description numerous specifics are set forth in order to provide a thorough understanding of the present invention. However, the present invention may be used without understanding many of these specific details.

Figure 1:
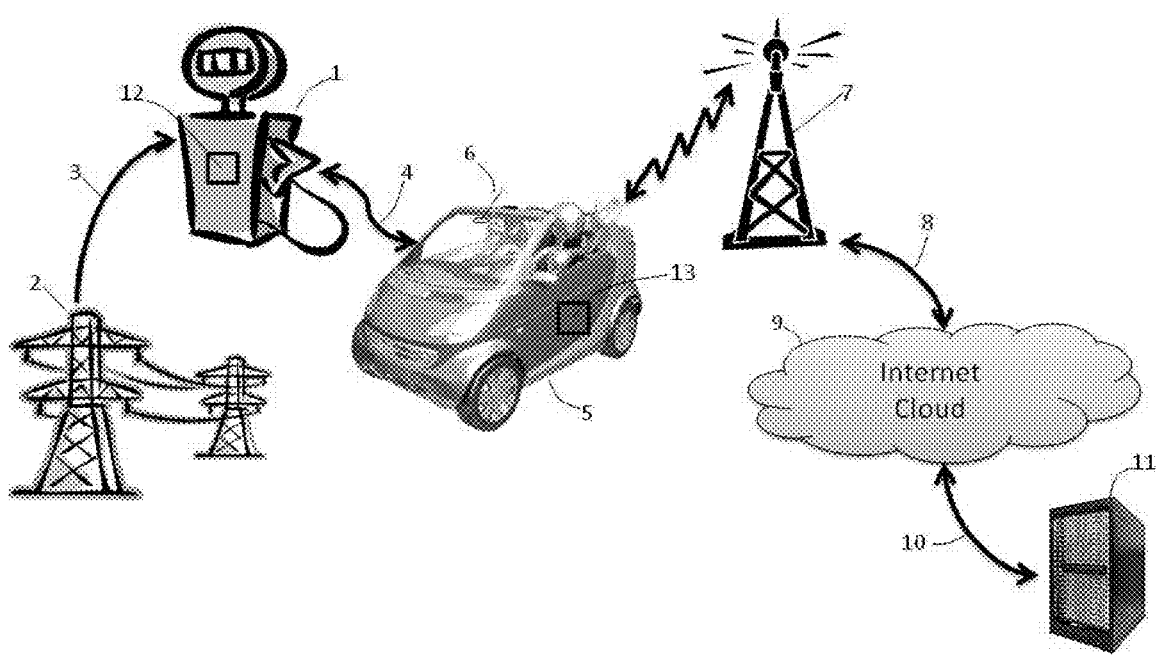
FIG. 1. Is a functional diagram of the Electric Vehicle charging system consistent with the principles of the present invention and shown coupled to an external power source.

Turning to the drawings, FIG. 1 illustrates a Charging Station 1 consistent with the principles of the present invention. The Charging Station 1 also includes connection to the Electric Grid Utility 2 where the Charging Station receives power to run its internal operation thru connection 3, and a connection 4 that is used to supply power for re-charging the internal battery of the Electric Vehicle 5.

In another specific embodiment, the Electrical Vehicle 5, consistent with the principles of the present invention includes a Wireless Communication Device 6 that is used to transmit and receive information with the Radio Network Controller 7 which is connected to the Ethernet Cloud thru cable 8 to a Computer Server Installation 11 thru cable 10.

As will be apparent from the description herein, in one aspect of the invention provides a manner of interfacing the Charging Station 1 to the Computer Server Installation 11. Another aspect of the invention provides a manner of interfacing the Charging Station 1 to the Electric Vehicle 5. Each of these aspects will be discussed in greater detail herein. However, it should be appreciated that each aspect of the invention may be implemented separate of the other in specific embodiments of the invention.

Specific embodiments which implement this aspect of the invention generally operate by utilizing multiple processing elements interfaced to each other using multiple communication radios utilizing a-symmetrical public key encryption algorithms to encrypt all data which travel over the public access communication channels. Enabling Public Key Infrastructure uses Public Key Certificates issued by a Certificate Authority that establishes the chain of trust between the Charge Station and the Electric Vehicle which is administrated by the Authentication Server which contains the Certificate Authority.

Figure 2:
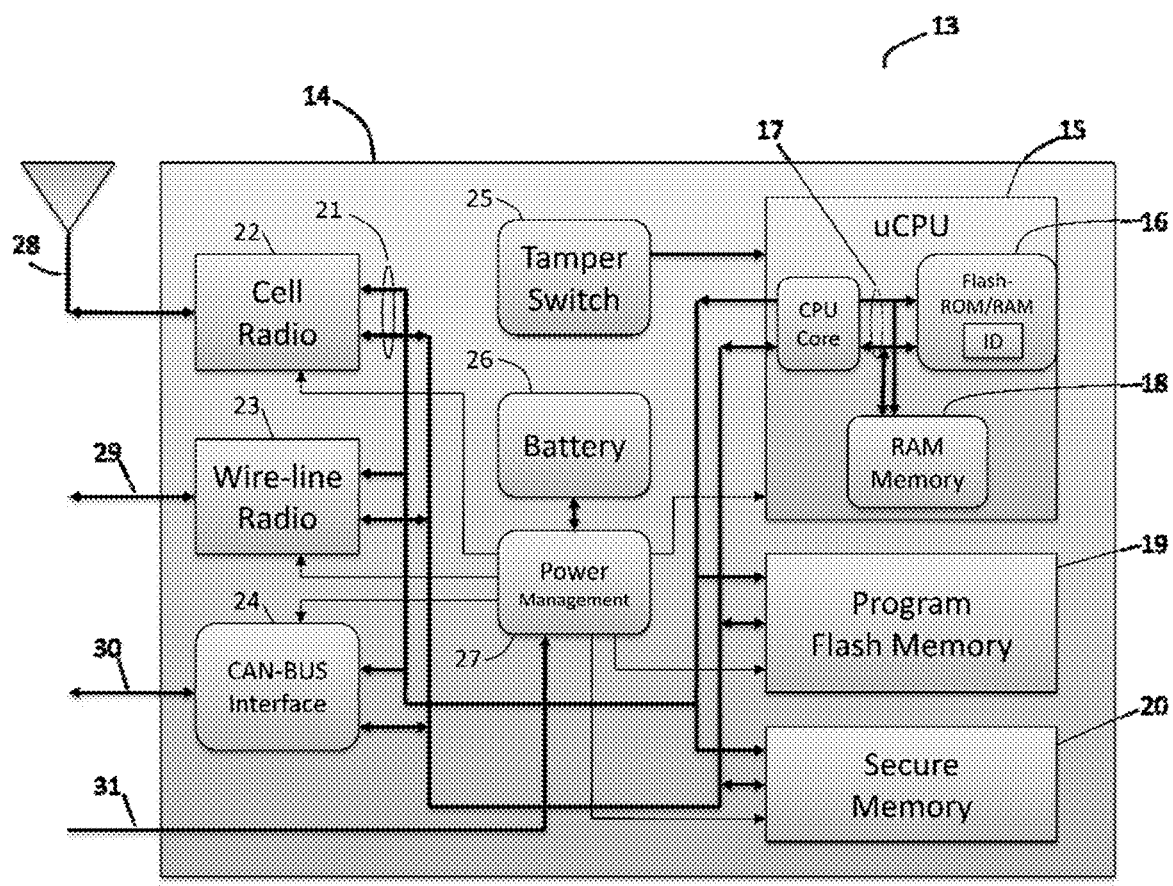
FIG. 2. Is a functional block diagram of a portion of the circuit board in the Electric Vehicle of FIG. 1

FIG. 2 illustrates a specific embodiment of the Circuit Board 13 in greater detail. As shown in the figure, a Circuit Board 14 in the Electrical Vehicle 5 includes a circuit arraignment shown in the form of a Micro Processor Unit 15 internally coupled to Flash re-programmable ROM 16 and RAM 18 over an internal Address and Data Bus 17. Secure System includes Secure Memory 20, Program Flash Memory 19 are coupled to Micro Processor 15 over Address and Data Bus 21. Other memory mapped devices such as a Cell Radio 22 used to communicate to a wireless Cellular Network, Wire-Line radio 23 used to communicate to a directly attached Charge Station, Can-Bus interface 24 used to communicate to the internal Electric Vehicle network are all coupled to the Micro Controller 15 over Address and Data Bus 21. The Tamper Switch 25 is included to protect the Circuit Board 13 from un-authorized physical access of the Circuit Board 13 by means of a pressure sensitive cover arrangement, such that the internal Battery 26 will supply current to the micro controller thru Power Manager 27 which will cause the Micro Processor to enter a safe operating mode which will erase the private ID that is used to encrypt all information within the circuit board 14.

Cell Radio 22 is coupled to an antenna 6 thru connection 28 to support Cellular Communication, Wire-Line radio 23 is coupled to Charge Cable 4 thru connection 29 to support Charge Communication, Can-Bus 24 is connected to Electric Vehicle's 5 internal Can-Bus network thru connection 30, Power Management 27 is connect to the Electric Vehicle's DC power source thru connection 31.

Figure 3:
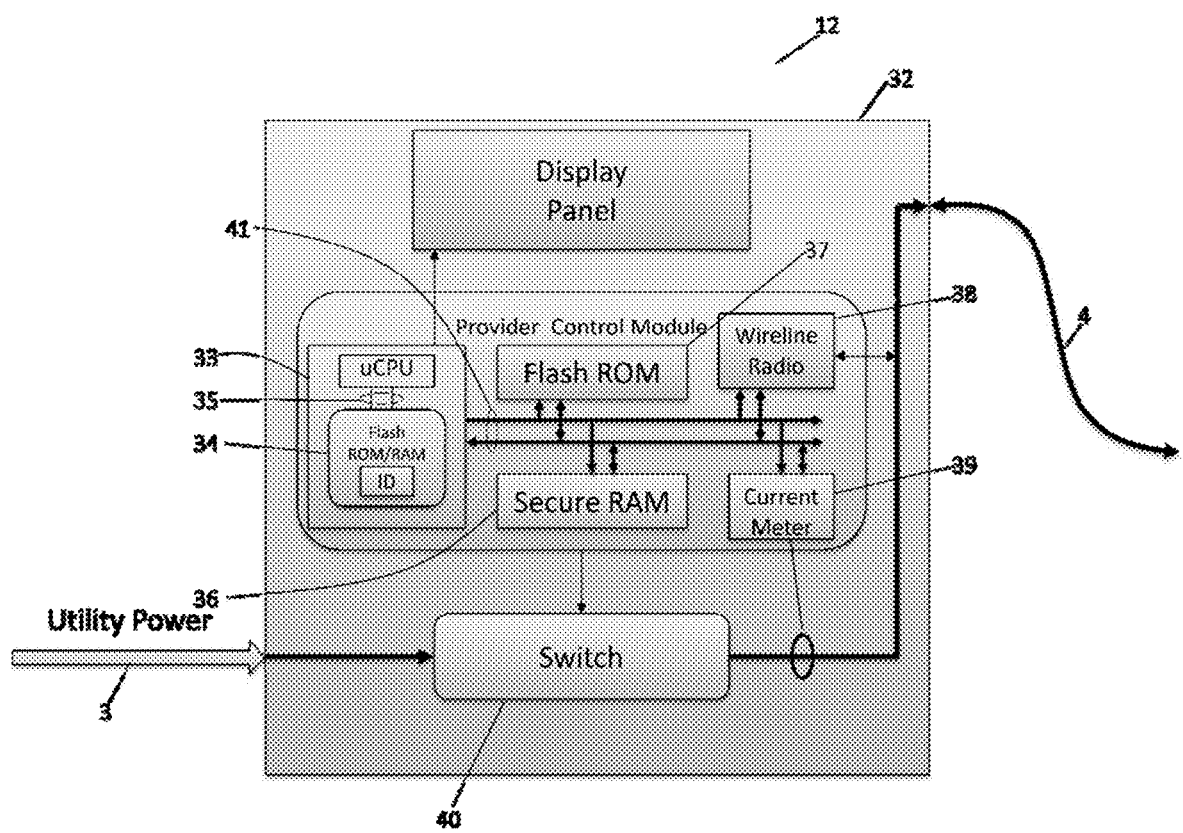
FIG. 3. Is a functional block diagram of a portion of the circuit board in the Charging Station of FIG. 1

FIG. 3 illustrates a specific embodiment of the Circuit Board 12 in greater detail. As shown in the figure, a Circuit Board 32 in the Charging Station 1 includes a circuit arraignment shown in the form of a micro processor unit 33 internally coupled to Flash re-programmable RAM and ROM 34 over an internal Address and Data Bus 35. Secure System includes Secure Memory 36, Program Flash Memory 37 are coupled to micro processor 33 over Address and Data Bus 41. Other memory mapped devices such as a Wire-Line radio 38 used to communicate to a directly attached Electrical Vehicle 5, Current Meter 39 used to measure the power flowing to the Electric Vehicle thru 4, Switch 40 used to connect Utility Power 4 to Electric Vehicle 5.

Figure 4:
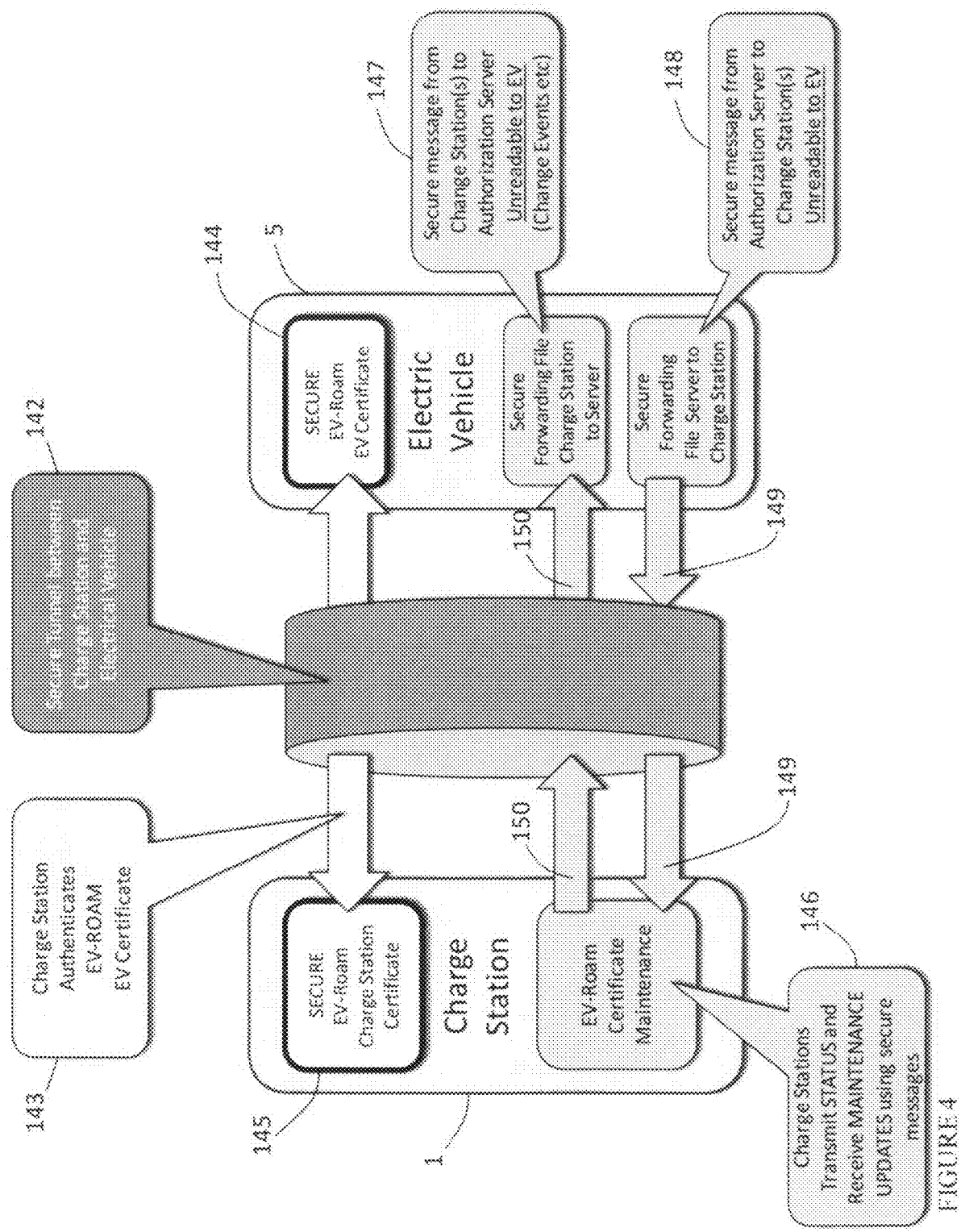
FIG. 4. Is a functional block illustrating the connection between the Change Station and Electric Vehicle.
Figure 5:
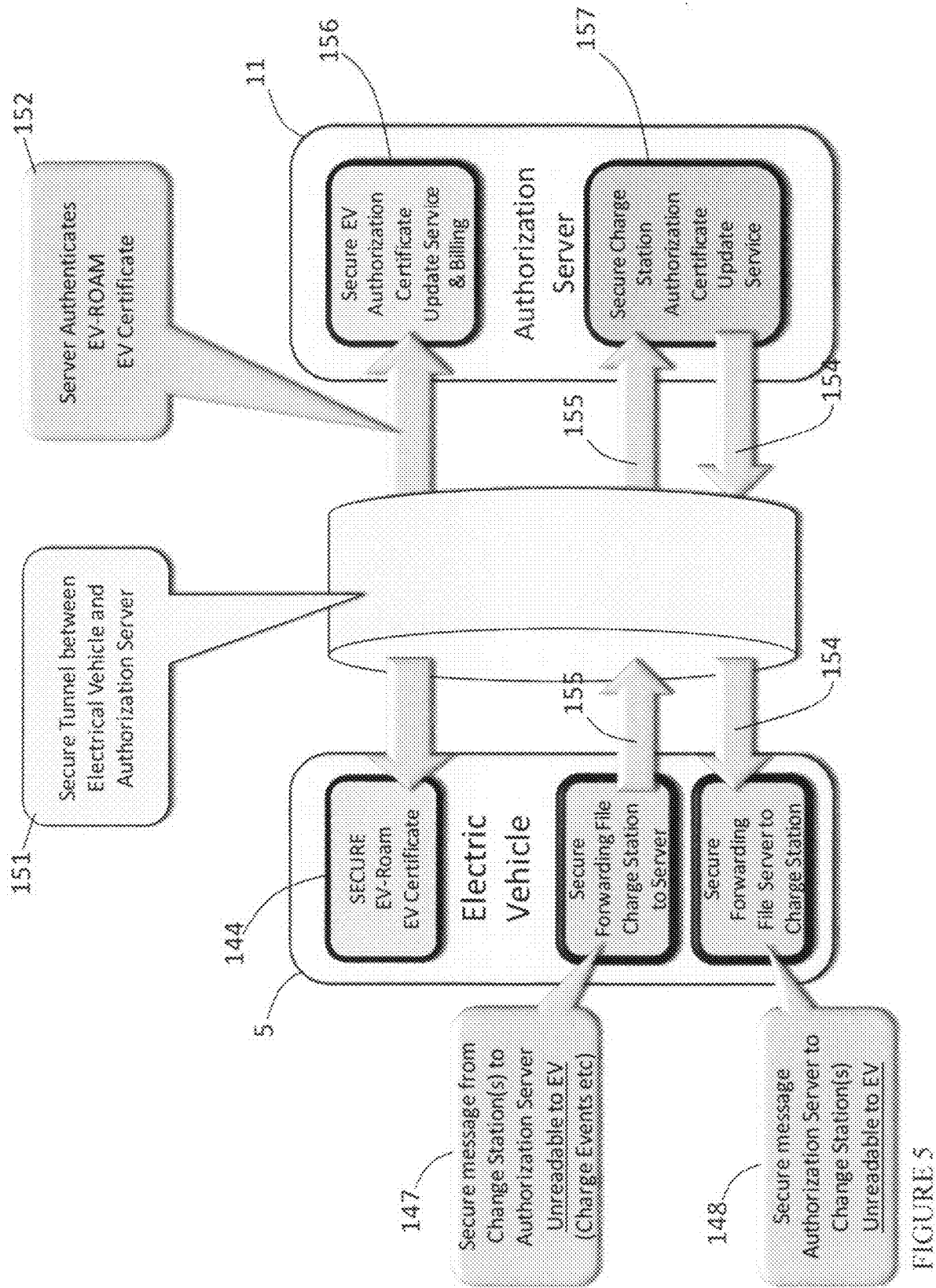
FIG. 5. Is a functional block illustrating the connection between the Electric Vehicle and Authorization Server.
Figure 6:
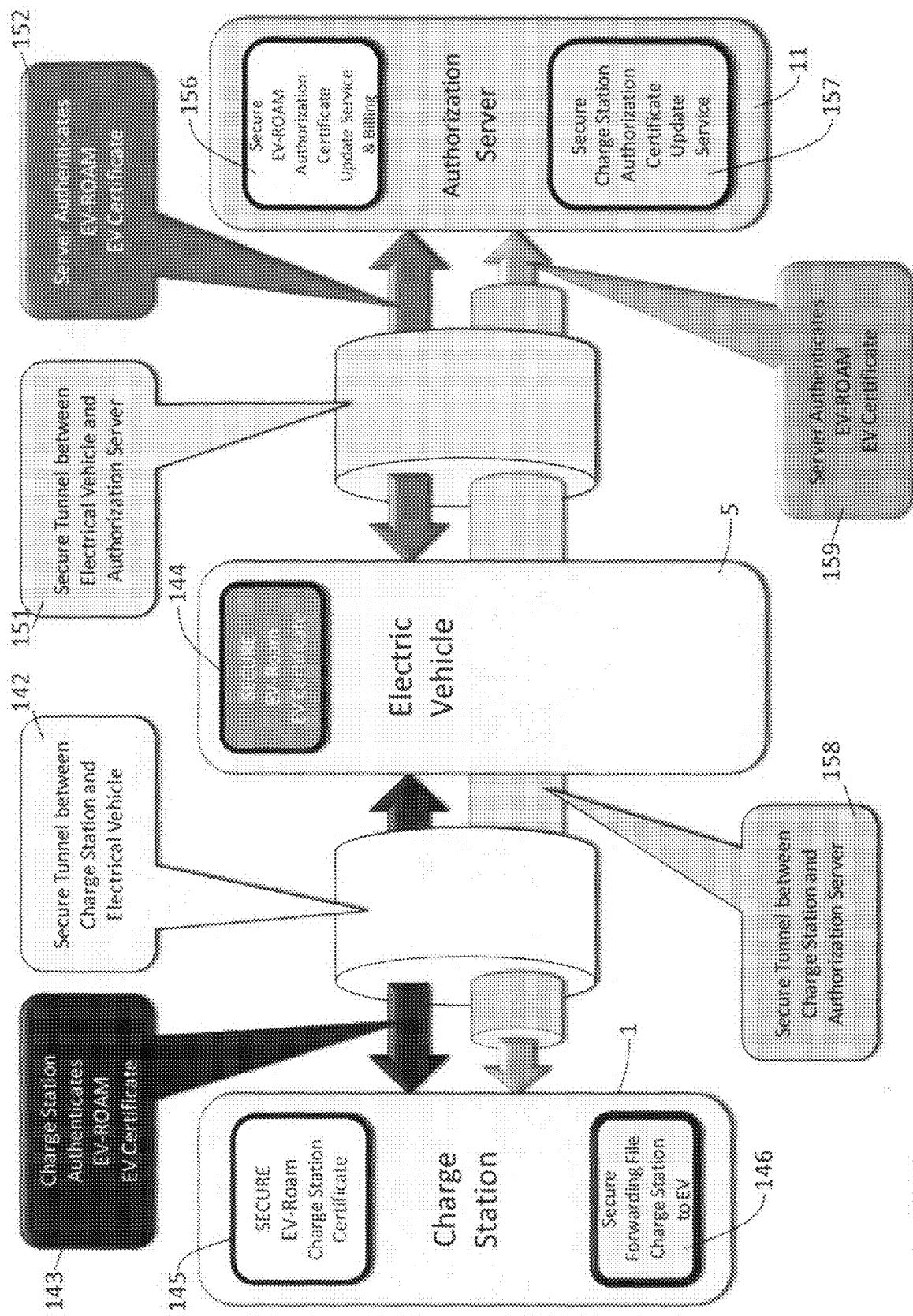
FIG. 6. Is a functional block illustrating the connection between the Change Station and Electric Vehicle and Authorization Server.

General operation of the Charge Station is illustrated in FIG. 4 and FIG. 6 from circuit arrangement detailed in FIG. 3, and from the Electric Vehicle circuit arrangement detailed in FIG. 5 and FIG. 6 Authentication flow detailed in FIG. 5 and FIG. 6.

Referring to FIG. 4, Initial query for connection is asserted creating the secure tunnel 142 between the Charge Station 1 and Electric Vehicle 5 using industry established PKI secure tunneling methods. Authentication of the EV-ROAM certificate from the Electric Vehicle sent via 143 occurs within Charge Station 1 using information contained from the Authentication Server certificate 145. Once the Charge Station verifies the Certificate from the Electric Vehicle 5, Power is released via connection 4 which is used to charge the Electric Vehicle. The physical representation of tunnel 143 may comprise of a wireless or wired radio.

Referring to FIG. 4, while the Secure Tunnel 142 exists, two independent communication channels are opened to the Electric Vehicle, one In Bound 149 the other Out Bound 150. The In Bound communication channel supplies periodic Update information 148 from the Authorization Server. The out Bound Communication Channel is used to report Status 147 of current and past charge events as well as operation health status 146. Traffic for both of these channels is covered from the Electric Vehicle. This aspect represents the first part of a two part method of maintaining the Charge Station using a secure store-forwarding messaging.

Referring to FIG. 5, periodically, the Electric Vehicle will contact the Authentication Server for reporting a Charge Event, or for Maintenance Updates. An Initial query for connection is asserted creating the Secure Tunnel 151 using industry established PKI secure tunneling between the Electric Vehicle and the Authentication Server. Once a Secure Tunnel is established, the Authorization Server service 156 can update the EV-ROAM EV Certificate 144 on the Electric Vehicle by message 152.

Referring to FIG. 5, while the Secure Tunnel 151 exists, two independent communication channels are opened to the Electric Vehicle, one In Bound 154 the other Out Bound 155. The In Bound communication channel supplies periodic Update Information 148 from the Authorization Server 157 to a Charge Station. The out Bound Communication Channel is used to except Status 147 of current and past charge events as well as operation health status 146 from a Charge Station. Traffic for both of these channels is covered from the Electric Vehicle. This aspect represents the second part of a two part method of Charge Station maintenance using a secure store-forwarding messaging.

As an addition aspect of the invention, referring to FIG. 6, the Electric Vehicle can act as a real-time communication conduit between the Authentication Server and Charge Station. In this case a second secure tunnel 158 is opened within secure tunnel 142 and secure tunnel 151. Messages 159 are used to transfer information between the Charge Station and Authorization Server such as Billing and Maintenance Updates without the Electric Vehicle incepting the traffic.

The following flowcharts provide additional detail.

Figure 7A:
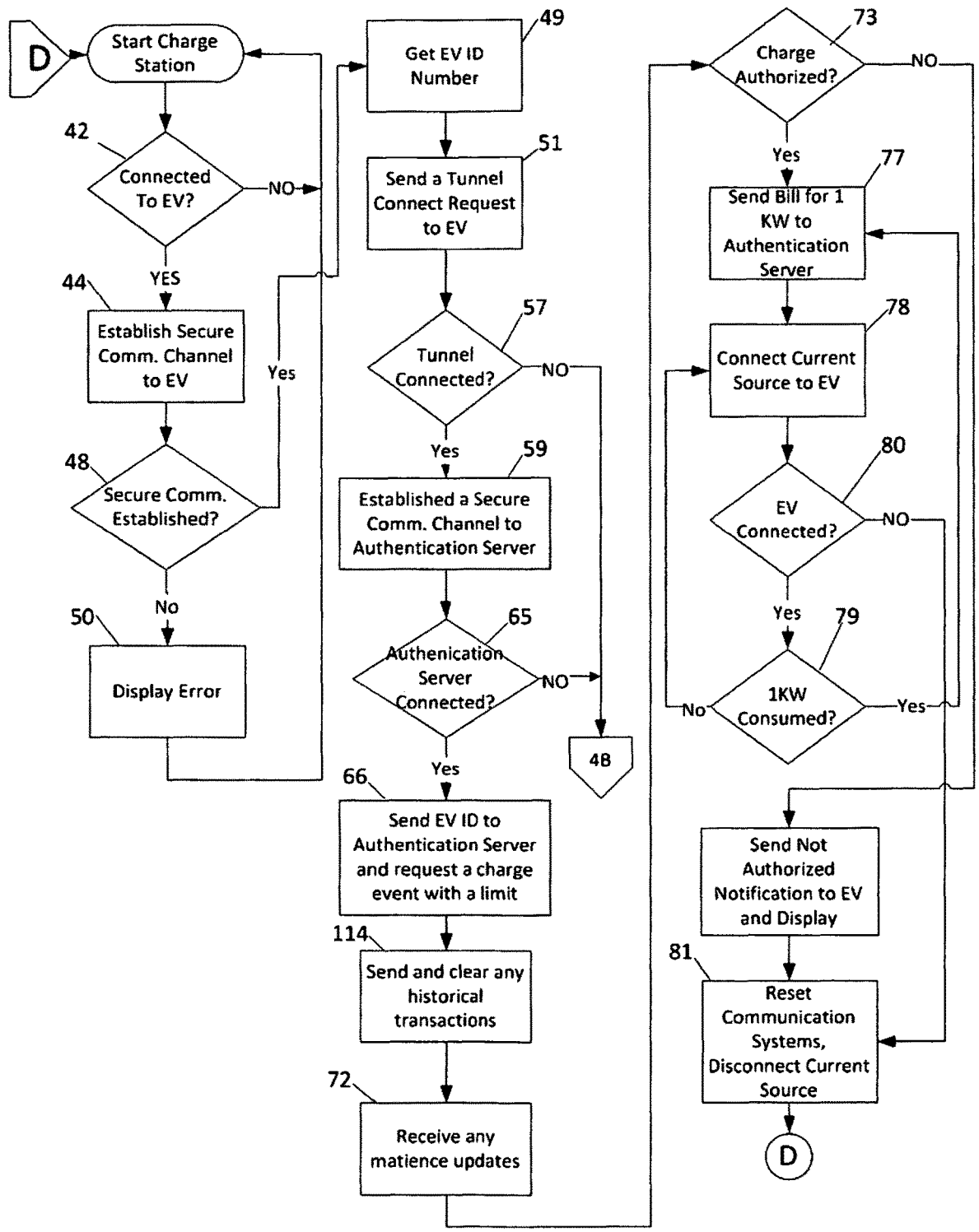
FIG. 7A.
Figure 7B:
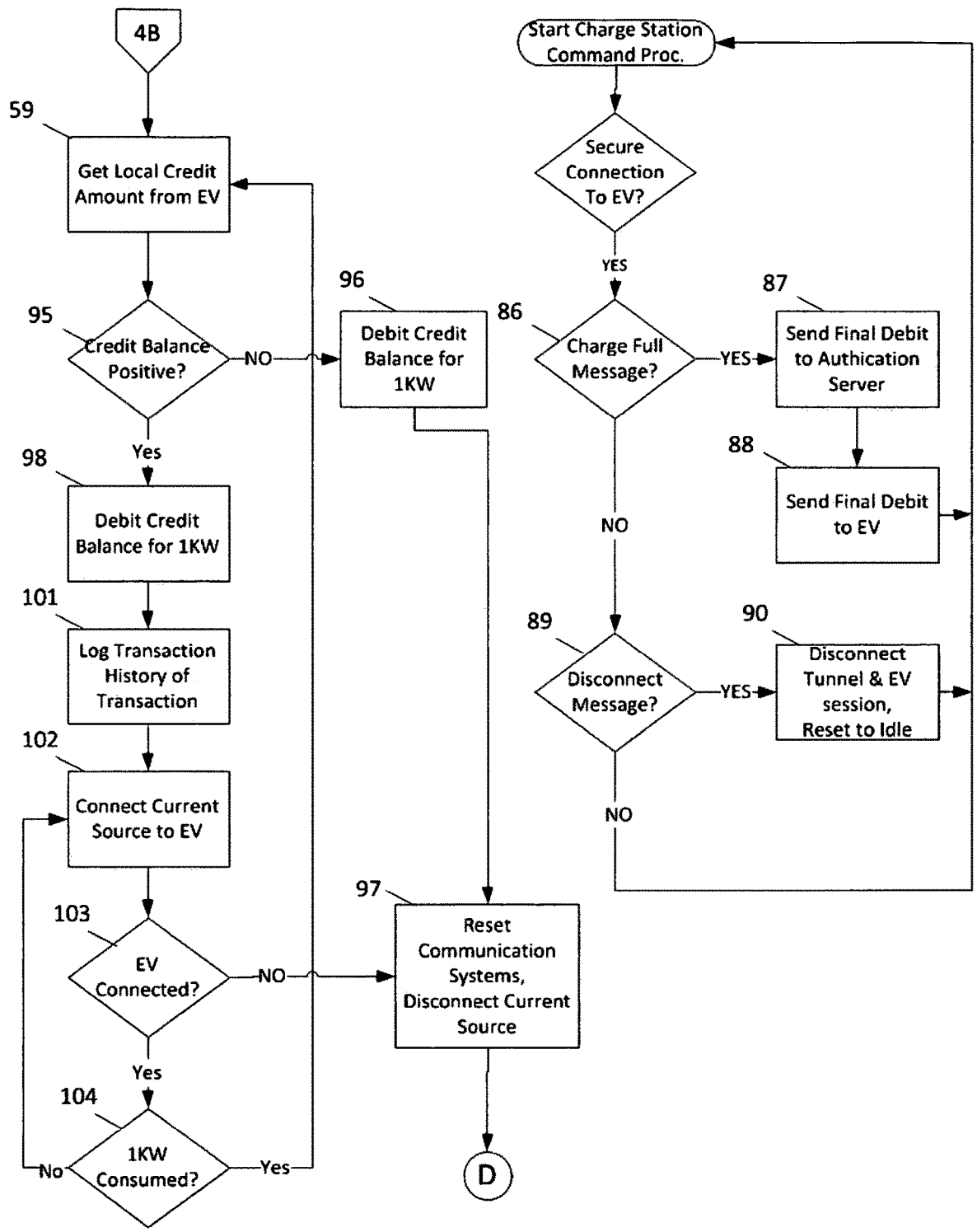
FIG. 7B. Is a flowchart illustrating the program flow executing on the CPU of FIG. 3.
Figure 8A:
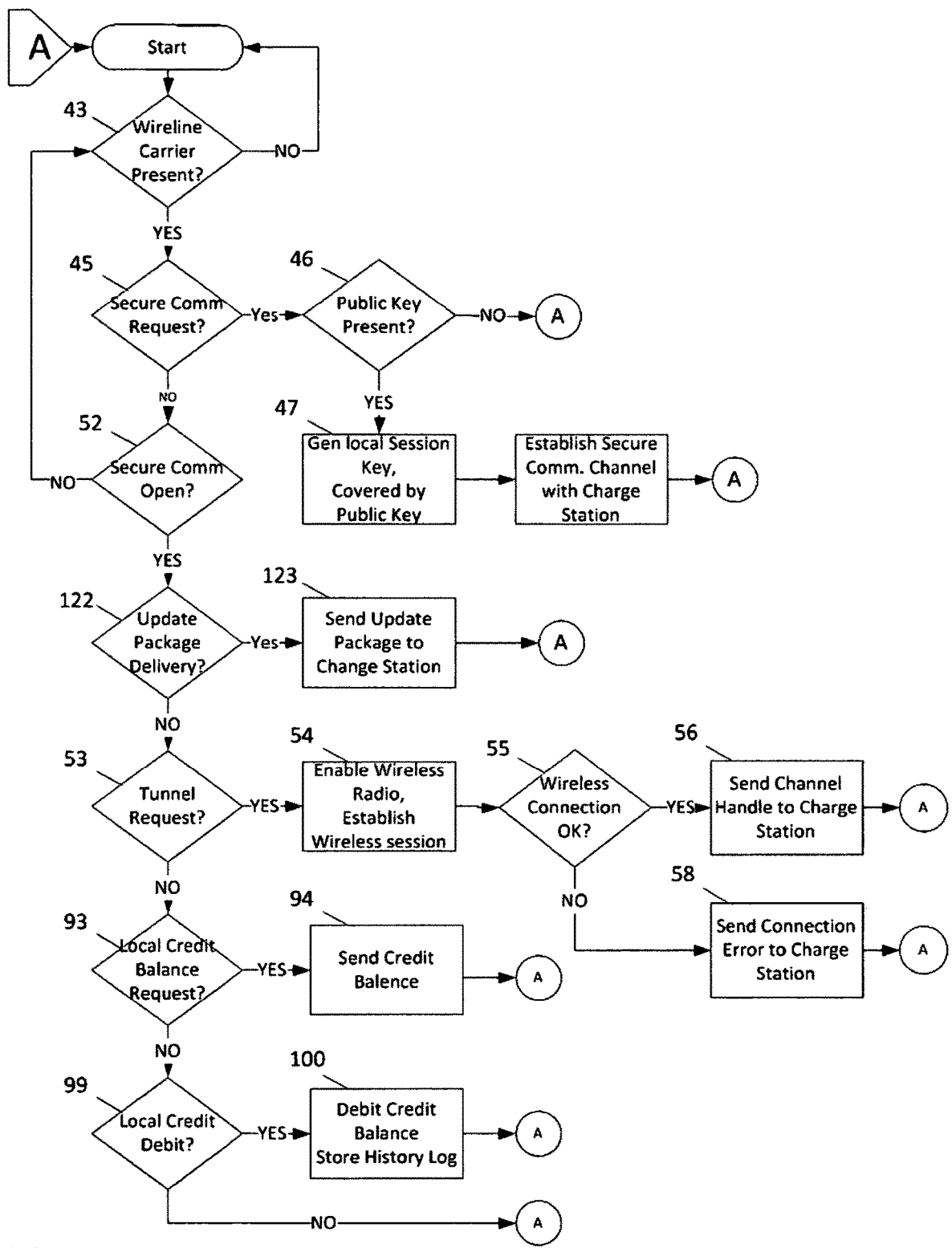
FIG. 8A.

Referring to FIG. 7A (Charge Station Flow), Initial query for connection 42 is asserted True when a positive response is received from Electric Vehicle, 43 (FIG. 8A) in response to detecting a wire-line connect query. After a basic wire-line connection is established between the Electric Vehicle and Charge Station, The Charge Station sends out a request for secure connection 44 to the Electric Vehicle by sending its Public Key ID to the Electric Vehicle 45 (FIG. 8A). The Electric Vehicle generates a Session Key which is covered by Charge Station Public key 46 (FIG. 8A) and 47 (FIG. 8A) and sends a response to the Charge Station 48. The Charge Station upon receiving a response from the Electric Vehicle sends an ID request to the Electric Vehicle covered by the Session Key, otherwise errors out to 50.

Referring to FIG. 7A (Charge Station Flow), 51 a secure tunnel request is asserted by the Charge Station. The requested is processed in the Electric Vehicle, Secure Connection valid 52 (FIG. 8A), at tunnel query 53 (FIG. 8A). This query begins a wireless communication connection 54 (FIG. 8A) using a GPRS radio 22 (FIG. 2) to establish a connection to the internet 55 (FIG. 8A). Upon successful connection 56 (FIG. 8A), an Internet routing handle is sent to the Charge Station 57. The Charge Station receiving an Internet Routing Handle, generates a communication request to an Authentication Server.

Figure 9A:
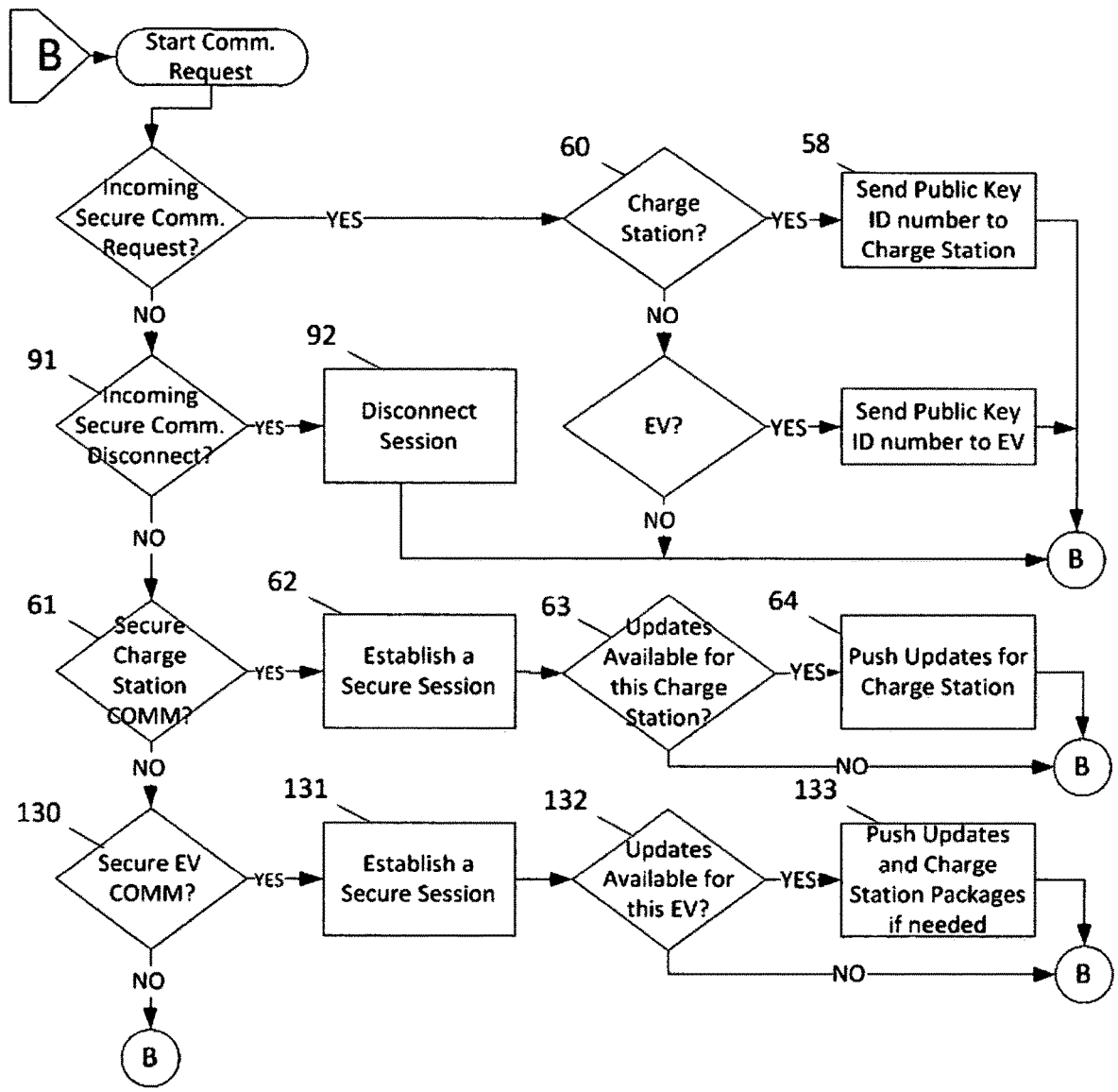
FIG. 9A.

Referring to FIG. 9A, the incoming communication request 60, for Charge Station is validated and responds with its ID number for its Public Key 58.

Referring to FIG. 7A, the Charge Station generates an Internet Session Key and covers this and its ID with the Authentication Server's Public Key which is sent to the Authentication Server 59. The Authentication Server checks for a Valid Charge Station ID 61 (FIG. 9A) and sends back a positive response 62 (FIG. 9A) establishing the secure communication session between the Charge Station 65 and the Authentication Server. The Authentication Server verifies the current revision status if the Charge Station 63 (FIG. 9A) and sends an update to the Charge Station 64 (FIG. 9A) if needed.

Referring to FIG. 7A, 66 The Charge Station sends the EV ID to the Authentication Server covered by the Internet Session Key with a Charge Event request and KW Limit. This query is detected referring to FIG. 9B, 67. The Authentication Server verifies the EV ID's Billing Status 68, 69 and responds with an Accepted Message 70 or Denied Message 71.

Referring to FIG. 7A, 64, the Charge Station sends any off-line billing history to the Authentication Server for processing and stores any updates received from the Authentication Server 72.

Figure 9B:
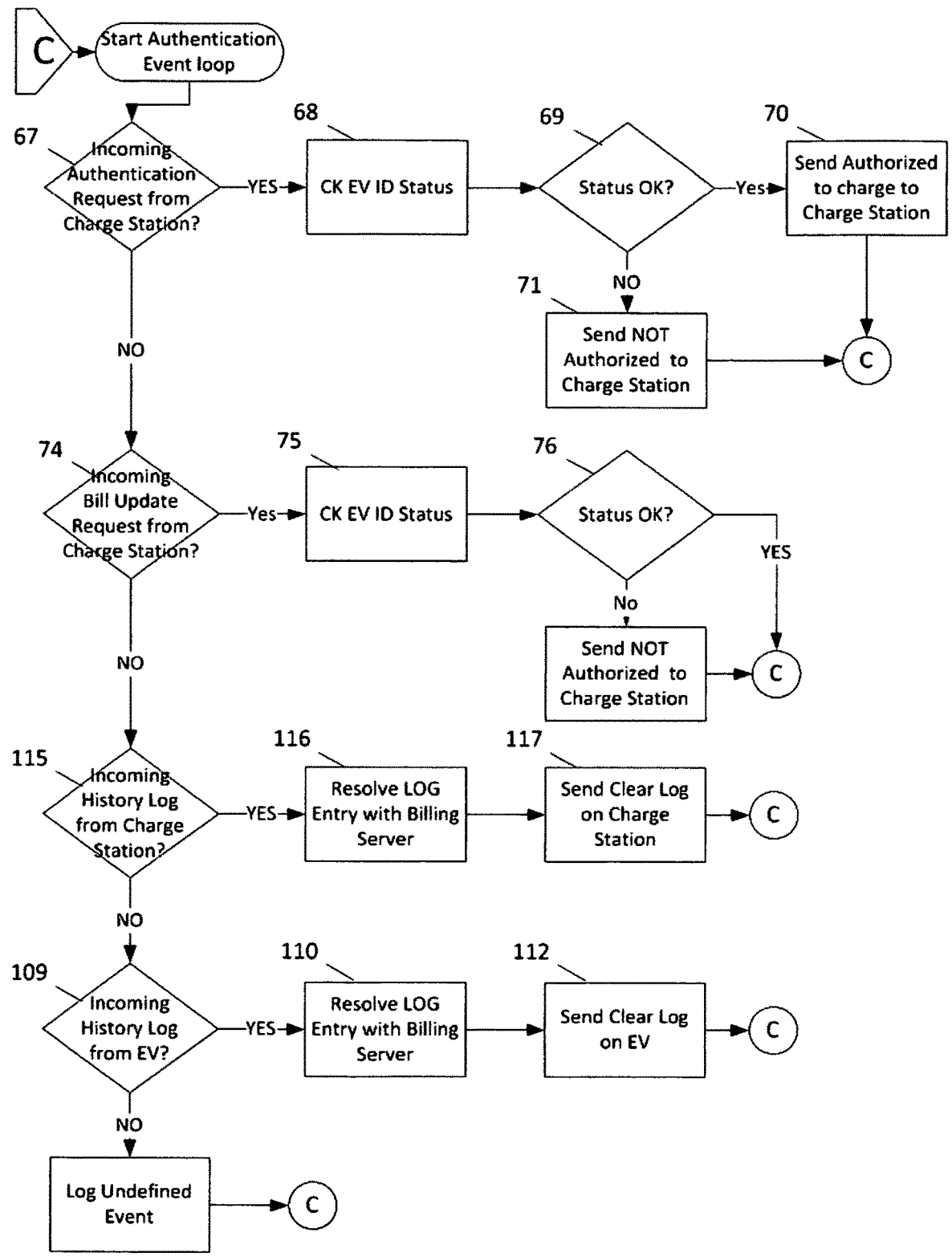
FIG. 9B. Is a flowchart illustrating the program flow executing on the Server of FIG. 1.

Referring to FIG. 7A, 73 the Charge Station processes the acceptance by sending a debit for a 1 KW 77 to the Authentication Server 74 (FIG. 9B), 75 (FIG. 9B), 76 (FIG. 9B). The Charge Station closes the current switch 77 and 40 (FIG. 3), connecting Utility Power to the Electric Vehicle thru connection 4 (FIG. 3) until 1 KW is measured on meter 39 (FIG. 3). Once the 1 KW of charge is consumed 79, another update request for 1 KW, 77 is send to the Authentication Server.

This method of sending periodic updates to the Authentication Server while a charge event is taking place covers surprise disconnect 80, which resets the Charge Station to initial state 81. The Charge Station always sends a debit to the server prior to delivering the charge to the Electric Vehicle; otherwise all communication to the Authentication Server is lost at the instant the Electric Vehicle disconnects from the Charge Station.

Figure 8B:
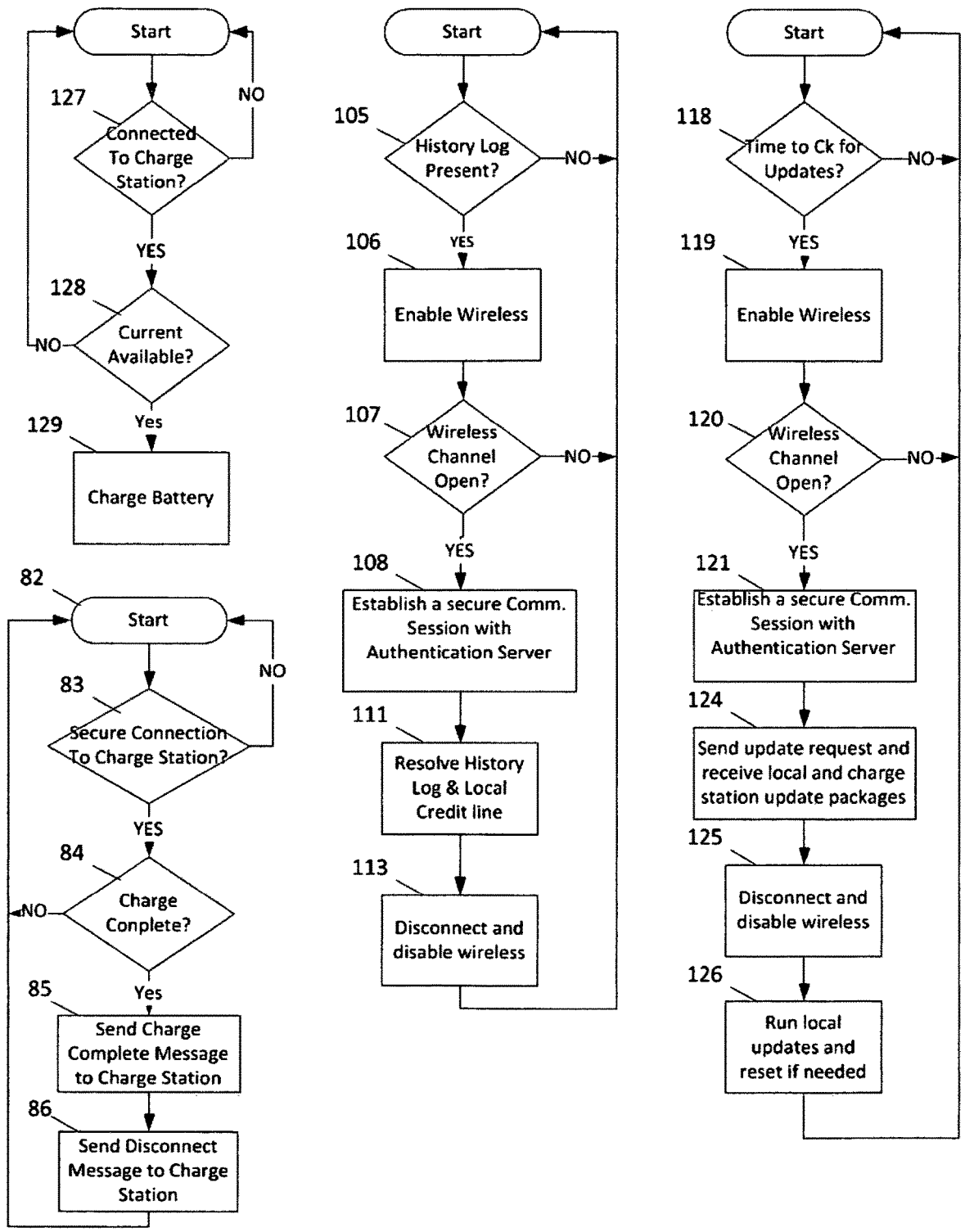
FIG. 8B. Is a flowchart illustrating the program flow executing on the CPU of FIG. 2.

Referring to FIG. 8B, 82 demonstrates the notification method for a completed battery charge event while connected to a Change Station 83, once the battery controller notifies the Electric Vehicle circuit arrangement 14 (FIG. 3) using the CAN-BUS connection 30 (FIG. 2), a charge complete message 85 is generated and sent using the Wire-Line Radio 23 (FIG. 2) via connection 29 (FIG. 2) which is coupled to cable 4 (FIG. 3) to the Charge Station where it's received 86. The final debit amount for the power consumed is sent to the Authentication Server 87 (FIG. 4B) and to the Electric Vehicle 88 (FIG. 4B) using the appropriate session keys. After the Electric Vehicle sends a charge complete message 85, it will send a Disconnection message to the Charge Station 89 (FIG. 4B) upon which the Charge Station sends a Disconnect Tunnel message 90 (FIG. 4B) to the Authentication Server 91 (FIG. 9A) which disconnects it session 92 (FIG. 9A) with the Charge Station. The Charge Station also terminates the Secure Channel to the Electric Vehicle message 90 (FIG. 4B) and returns to idle state waiting for the next connection.

Referring to FIG. 7A, 57 or 65, If the wireless connection was not available, a no-connect message is sent to the Charge Station which causes the Charge Station to access the Electric Vehicle per-arranged credit line 59.

Referring to FIG. 8A, A pre-determined credit balance is stored within secure memory on 13 (FIG. 2) within the Electric Vehicle is processed 93 and returned to the Charge Station 94.

Referring to FIG. 4B, the Charge Station verifies there is a positive balance 95, and issues a 1 KW debit message to the Electric Vehicle 98 and also stored it the Charge Station History Log 101. The message is processed in the Electric Vehicle 99 (FIG. 8A) and stored in its history log 100 (FIG. 8A) for future Authentication Server sync. The Charge Station begins a Charge Event 102 and cycles thru 103, 104, and back to 59 to request new balance from the Electric Vehicle until either the Batteries are charged or the balance in the Electric Vehicle is depleted.

In another aspect of the invention, whenever the Electric Vehicle Credit Balance is below the initial value and the history log is present due to an "Off Line" charge event referring to FIG. 8B 105, the Electric Vehicle will send an update for Billing at a later time when the Wireless Communication is in range 106, using the Wireless Radio 6 (FIG. 1) to open a communication channel to Authentication Server 107. A secure Communication request is made 108 and processed at the Authentication Server 109 (FIG. 9B), and is resolved at 110 (FIG. 9B) & 111, where the Billing Debit and Billing Credit is exchanged. Once the Credit is issued to the Electric Vehicle a Clear Log command is send to the Electric Vehicle 112 (FIG. 9B). A disconnect command from the issued from the Electric Vehicle 113.

In an additional aspect of the invention, referring to FIG. 7A, whenever the Charge Station has a history log from an "Off Line" Charge Event, this Debit message is sent to the Authentication Server once a secure communication channel is established 114. This log is resolved 115 (FIG. 9B) & 116 (FIG. 9B) with the Electric Vehicle Credit Balance when the Electric Vehicle establishes communication session at a later time. Alternatively, if the Electric Vehicle had already cleared the History with the Authentication Server, prior the Charge Station contact, the history log is also cleared 117 (FIG. 9B).

Program updates and Public Key updates may be remotely enabled every time a secure communication session is established between the EV and the Authentication Server that is independent of a Charging Event. Periodically the EV will contact the Authentication Server to check for updates referring to FIG. 8B 118. 119 enables the Wireless Radio 6 (FIG. 1) to open a communication channel to Authentication Server 120, 130 (FIG. 9A), 121 & 131 (FIG. 9A). If an update is available 132 (FIG. 9A) the update is pushed to the Electric Vehicle, 133 (FIG. 9A) which is scheduled to be processed 124 and a disconnect command is issued 125. The Update is processed at 126. Also if a Charge Station Update is available based on the location history of the Electric Vehicle, a Charge Station update package is downloaded which will be pushed to the Charge Station at a later time 124 when a package is present 122 (FIG. 8A) and sent to the charge station 123 (FIG. 8A).

To insure an Electric Vehicle can be charge at any time, as an aspect of the invention, referring to FIG. 8B, the connection to a Charge Station 127 is independent to the Wire-line method herein. IF a connection is established and current is available 128, the battery controller 129 will charge the battery as a separate path to the Authentication method described herein.

To indicate the cost per kilowatt of power based on Time of day and day of the week or any arbitrary future date and or time, a rate schedule can be loaded into the Charge Station 1 (FIG. 1) by previously described methods based on its ID number using the program update method contained herein. This information can be used to display the cost of charging based on time and date which can be changed when ever an Electric Vehicle connects to it.

The invention claimed is:

1. A system for coordinating electric vehicle charging events, the system comprising:
  a first computing system for each of a plurality of electric vehicles, the first computing system communicatively coupled to a remote server via a wireless communication link and comprising a first processor, wherein the first processor is configured to
    detect establishment of an electrical connection (physical or wireless) between the respective electric vehicle and a charging station of a plurality of charging stations, wherein the detected establishment of the electrical connection corresponds to initiation of a charge event,
    exchange, with a second computing system of the charging station via a second communication link responsive to detecting the electrical connection, a first unique authenticated identification key for the respective electric vehicle and a second unique authenticated identification key for the charging station,
    transmit, to the remote server via the wireless communication link, transaction information for the charging event, wherein the transaction information includes the first authenticated identification key and the second authenticated identification key,
    receive, from the remote server, pricing information for the charging event based on the transmitted transaction information,
    transmit, to the second computing system of the charging station, the pricing information for the charging event,
    validate the transaction information,
    initiate the charging event with the charging station to charge the respective electric vehicle through an electrical connection in response to validation of the transaction information, and
    transmit, to the remote server responsive to detecting completion of the charging event between the respective electric vehicle and the charging station, charging data for the charging event; and
  the remote server for coordinating charging events between the plurality of electric vehicles and the plurality of charging stations, wherein the remote server comprises a second processor and a second memory, the second processor configured to
    receive, from the first computing system of the respective electric vehicle, the transaction information for the charging event between the respective electric vehicle and the charging station,
    transmit, to the first computing system of the respective electric vehicle, pricing information for the charging event based in part on the transaction information, wherein the pricing information is obtained from another remote server for a charging service provider,
    receive, from the first computing system of the respective electric vehicle upon completion of the charging event, the charging data for the charging event, and
    control remittance of payment from an owner of the respective electric vehicle to the charging service provider based in part on the charging data, the pricing information, and payment information for the owner of the electric vehicle stored in the second memory.

* * * * *